(12) United States Patent
Fang et al.

(10) Patent No.: US 12,406,431 B2
(45) Date of Patent: Sep. 2, 2025

(54) METHOD AND SYSTEM FOR SEMANTIC-DRIVEN INTELLIGENT RECONSTRUCTION OF LARGE-SCENE SPARSE LIGHT FIELD

(71) Applicant: TSINGHUA UNIVERSITY, Beijing (CN)

(72) Inventors: Lu Fang, Beijing (CN); Haiyang Ying, Beijing (CN); Jinzhi Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 176 days.

(21) Appl. No.: 18/454,513

(22) Filed: Aug. 23, 2023

(65) Prior Publication Data

US 2024/0078744 A1  Mar. 7, 2024

(30) Foreign Application Priority Data

Aug. 25, 2022  (CN) .......................... 202211025358.0

(51) Int. Cl.
  *G06T 15/20* (2011.01)
  *G06T 7/90* (2017.01)
(52) U.S. Cl.
  CPC ............... *G06T 15/20* (2013.01); *G06T 7/90* (2017.01); *G06T 2207/10024* (2013.01)
(58) Field of Classification Search
  None
  See application file for complete search history.

(56) References Cited

U.S. PATENT DOCUMENTS

2020/0158869 A1\* 5/2020 Amirloo Abolfathi ...................... G06T 7/521
2024/0362894 A1\* 10/2024 Yu .......................... G06V 20/70

FOREIGN PATENT DOCUMENTS

| CN | 114494610 | 5/2022 |
| CN | 114913287 | 8/2022 |

OTHER PUBLICATIONS

CNIPA, First Office Action for CN Application No. 202211025358.0, Oct. 9, 2022.

\* cited by examiner

*Primary Examiner* — Frank S Chen
(74) *Attorney, Agent, or Firm* — Hodgson Russ LLP

(57) ABSTRACT

A method includes: acquiring a semantic primitive set of a multi-view image set; acquiring a coordinate offset by inputting coordinate information and a feature vector corresponding to a first grid sampling point of the semantic primitive set into a first network model, and acquiring a second grid of the semantic primitive set based on the coordinate offset and geometric attribute information of the semantic primitive set; acquiring first feature information of a second grid sampling point by inputting coordinate information and a feature vector corresponding to the second grid sampling point, and an observation angle value into a second network model, and acquiring second feature information of the semantic primitive set based on the first feature information; and acquiring a light field reconstruction result of the multi-view image set based on an observation angle value of the semantic primitive set and third feature information extracted from the second feature information.

20 Claims, 8 Drawing Sheets

METHOD AND SYSTEM FOR SEMANTIC-DRIVEN INTELLIGENT RECONSTRUCTION OF LARGE-SCENE SPARSE LIGHT FIELD

CROSS-REFERENCE TO RELATED APPLICATIONS

This application claims priority to Chinese Patent Application No. 202211025358.0, filed on Aug. 25, 2022, the entire disclosure of which is incorporated by reference herein.

TECHNICAL FIELD

The disclosure relates to a field of three-dimensional reconstruction and artificial intelligence technologies, and particularly to a method and a system for semantic-driven intelligent reconstruction of a large-scene sparse light field.

BACKGROUND

Semantic reconstruction of a large-scene sparse light field is a core technical problem in the fields of artificial intelligence, machine vision, and an unmanned system, which is of great significance to achieve efficient representation of a light field and scene rendering. Semantic reconstruction of the large-scene sparse light field refers to extracting structural semantic information in a scene from a sparse observation, and reconstructing a high-precision large-scene light field on the basis of the structural semantic information.

SUMMARY

A method for semantic-driven intelligent reconstruction of a large-scene sparse light field is provided in a first aspect of embodiments of the present disclosure. The method includes:
  acquiring a semantic primitive set of a multi-view image set, in which the semantic primitive set includes at least one semantic primitive, and the multi-view image set includes at least one image;
  acquiring a coordinate offset by inputting coordinate information and a feature vector corresponding to a first grid sampling point of the semantic primitive set into a first network model, and acquiring a second grid of the semantic primitive set based on the coordinate offset and geometric attribute information of the semantic primitive set;
  acquiring first feature information of a second grid sampling point by inputting coordinate information and a feature vector corresponding to the second grid sampling point and an observation angle value into a second network model, and acquiring second feature information of the semantic primitive set based on the first feature information, in which the first feature information includes a visibility value and a color value of the second grid sampling point; and
  acquiring a light field reconstruction result of the multi-view image set based on an observation angle value of the semantic primitive set and third feature information extracted from the second feature information, in which the third feature information includes a spatial offset, a visibility value and a color value of the semantic primitive set.

A system for semantic-driven intelligent reconstruction of a large-scene sparse light field is provided in a second aspect of embodiments of the disclosure. The system includes:
  a feature acquiring module, a gateway module, a local database and an intelligent reconstruction module successively connected;
  the intelligent reconstruction module is configured to:
  acquire a semantic primitive set of a multi-view image set from the local database, in which the semantic primitive set includes at least one semantic primitive, and the multi-view image set includes at least one image;
  acquire a coordinate offset by inputting coordinate information and a feature vector corresponding to a first grid sampling point of the semantic primitive set into a first network model, and acquire a second grid of the semantic primitive set based on the coordinate offset and geometric attribute information of the semantic primitive set;
  acquire first feature information of a second grid sampling point by inputting coordinate information and a feature vector corresponding to the second grid sampling point, and an observation angle value into a second network model, and acquire second feature information of the semantic primitive set based on the first feature information, in which the first feature information includes a visibility value and a color value of the second grid sampling point; and
  acquire a light field reconstruction result of the multi-view image set based on an observation angle value of the semantic primitive set and third feature information extracted from the second feature information, in which the third feature information includes a spatial offset, a visibility value and a color value of the semantic primitive set.

Additional aspects and advantages of the present disclosure will be set forth in part in the following description, and in part will become obvious from the following description, or may be learned by practice of the disclosure.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

Figure 1:
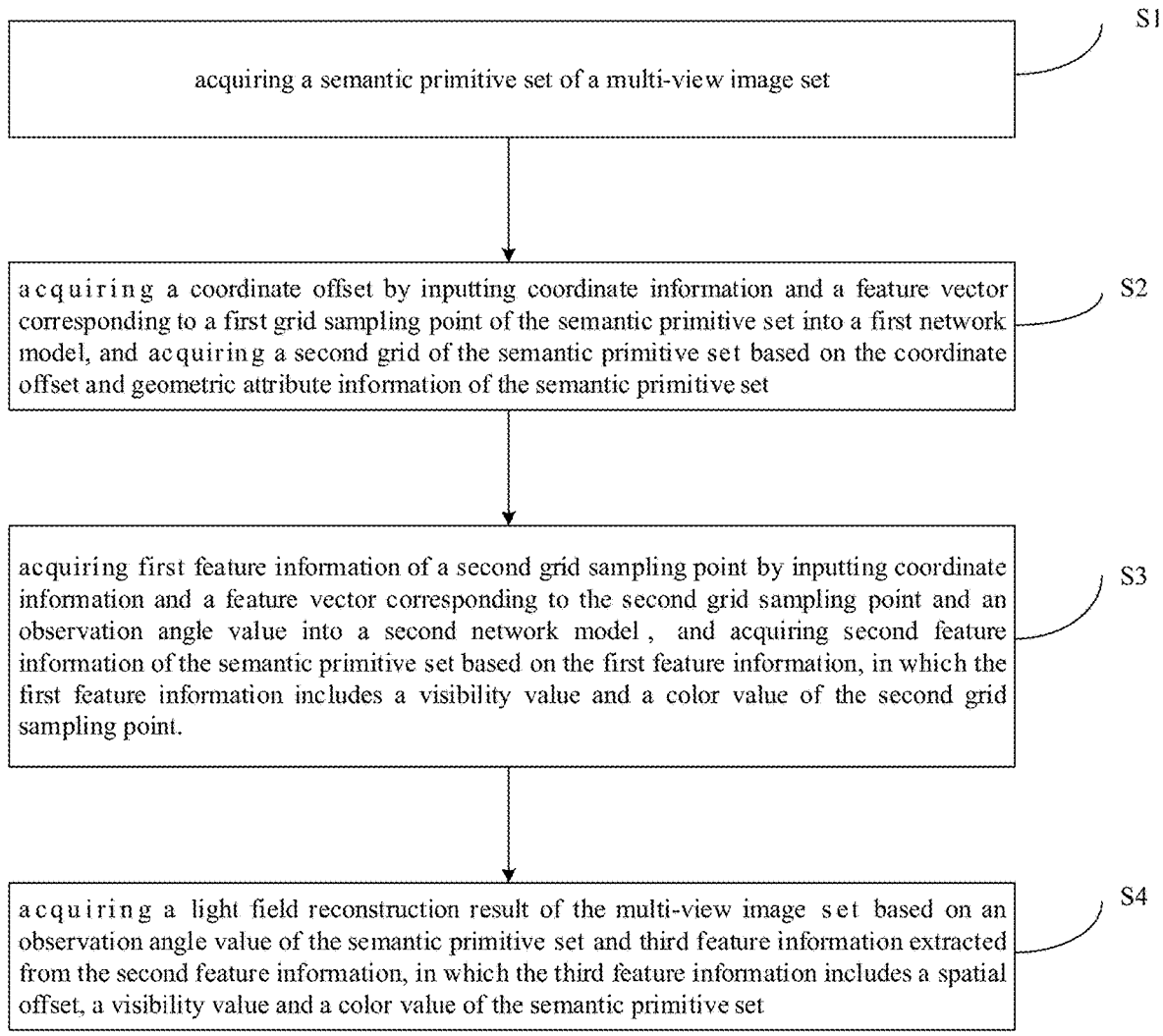
FIG. 1 is a flowchart illustrating a method for semantic-driven intelligent reconstruction of a large-scene sparse light field according to embodiments of the present disclosure.

Embodiments of the present disclosure are described in detail below, and examples of embodiments are illustrated in the accompanying drawings, in which the same or similar labels represent the same or similar elements or elements with the same or similar functions. The embodiments described below with reference to the drawings are exemplary, is intended to be configured to explain the present disclosure and are not to be construed as a limitation of the present disclosure.

In the real world, reconstruction of a high-precision light field often relies on a dense observation, most of current reconstruction algorithms need to perform a dense scanning on the scene. However, since an observation of the light field in the large scene is often sparse, reconstruction completeness and precision are greatly reduced due to information loss. An existing semantic reconstruction algorithm parses the structural semantic information of the scene, and represents a scene as a combination of a plurality of planes. However, the representation cannot model local irregular geometric details of the scene, resulting in a low reconstruction precision.

Reconstruction of the large-scene light field is an important problem in computer vision. Generally, the more the observation of the scene, the more abundant information available for the reconstruction. In order to achieve high-precision reconstruction of the large-scene light field, a dense scene sampling is required. Typical light field reconstruction algorithms include a reconstruction method based on a multi-view depth map set, a reconstruction method based on a voxel set and a reconstruction method based on a point cloud. The method based on a multi-view depth map set generates a depth map for each view by a view transformation and a feature aggregation, and obtains a reconstruction result by fusing the depth maps for multiple views, which has a relatively good performance on a large-scene reconstruction with a simple geometric structure and a simple occlusion relationship, currently, the reconstruction precision of this kind of method is the highest. The reconstruction method based on a voxel set split a space into a regular three-dimensional grid, and predicts an attribute of each voxel by using multi-view consistency information, which requires to make a balance on a memory consumption and a resolution, and is large in the memory consumption when a high-resolution reconstruction is performed on a large scene. The reconstruction method based on a point cloud directly operates a three-dimensional point cloud, and continuously densify the point cloud by using a feature matching of multi-view images, to obtain a reconstruction result, which has a good reconstruction effect on a scene rich in texture, but holes may appear in a region lack of texture. In recent years, a neural rendering technology has developed rapidly, which may achieve the rendering of a high-resolution novel view rendering on the basis of a dense sampling by performing a unified modeling on color, illumination and density of the scene. However, the method relies on a dense RGB sampling, or has a high degree of dependence on a geometric prior of the scene.

A light field reconstruction based on semantics is an intersection of computer graphics and computer vision, and aims to improve the completeness of light field reconstruction by establishing an understanding of semantics in a scene. An existing semantic reconstruction method achieves a simplified representation of a scene using mostly basic geometric elements, and for example, only a scene representation of a plane set or a mixture of a plane set and a non-plane set is adopted, which has a relatively complete reconstruction effect on a planar region lacking texture, but cannot represent a more complex geometric surface (such as a spherical surface, a cylindrical surface and other quadric surfaces), and cannot retain geometric details (such as textures on a sculpture) of the planar region. In some other methods, a hole in a depth map is complemented by constructing basic lines or triangular surfaces based on an initial three-dimensional point cloud (but these methods are not robust for noisy point clouds, and a geometric precision is not high). Currently, the neural rendering technology is also applied to the light field reconstruction, which integrates a constraint of geometric semantics into a reconstruction of an indoor scene by adding a special regular term or an additional semantic detection module, which improves the precision to a certain extent. However, semantic type used by the method is very single (only limited to a plane), and also lacks precise modeling of a geometric boundary. The existing technical solutions have the following disadvantages:

(1) For the large-scene light field reconstruction: whether the reconstruction method based on a depth map set, a voxel set or a point cloud, or the emerging method based on neural rendering, requires a dense perspective sampling to ensure the completeness and precision, a sparse view may result in a reduction in performance, which is particularly serious in a region lacking texture.

(2) For the light field reconstruction based on semantics: in the existing methods, a scene is simplified by using a semantic primitive, while geometric details cannot be effectively retained, a complex geometric surface cannot be modeled and a geometric boundary lacks precise modeling, resulting in a low overall precision.

A method, a system and an apparatus for semantic-driven intelligent reconstruction of a large-scene sparse light field provided in embodiments of the disclosure are described referring to the drawings.

The method for semantic-driven intelligent reconstruction of a large-scene sparse light field according to embodiments of the present disclosure is described first referring to the drawings.

FIG. 1 is a flowchart illustrating a method for semantic-driven intelligent reconstruction of a large-scene sparse light field according to embodiments of the present disclosure.

As illustrated in FIG. 1, the method includes the following steps.

At S1, a semantic primitive set of a multi-view image set is acquired, in which the semantic primitive set includes at least one semantic primitive, and the multi-view image set includes at least one image.

Specifically, in the embodiments, the multi-view image set is acquired, a sparse point cloud of the multi-view image set is acquired by using an existing multi-view three-dimensional reconstruction algorithm, and a semantic primitive set included in a point cloud scene is detected by using a geometric primitive detection algorithm.

Further, a multi-view segmented image set is acquired by segmenting the multi-view image set based on the semantic primitive set and sparse point cloud information.

Preferably, the algorithm used for generating the sparse point cloud includes but is not limited to various multi-view 3D reconstruction algorithms such as SM.

Preferably, the algorithm used for generating the semantic primitive set includes but is not limited to RANSAC, Region Growing.

Preferably, an image segmentation method guided by the semantic primitive includes but not limited to a watershed algorithm, various super pixel segmentation algorithms, a region adjacent graph optimization method and other image segmentation algorithms.

Figure 2:
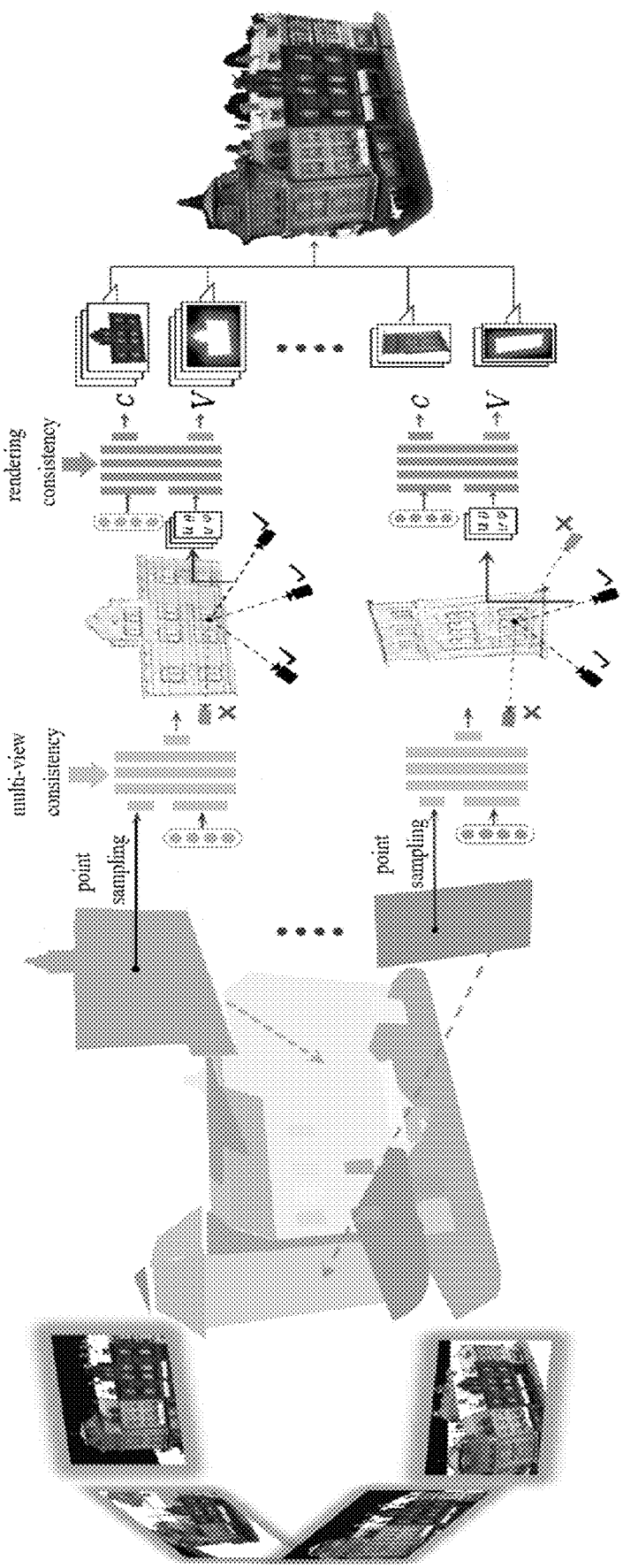
FIG. 2 is a block diagram illustrating a semantic-driven intelligent reconstruction operation of a large-scene sparse light field according to embodiments of the present disclosure.
Figure 3:
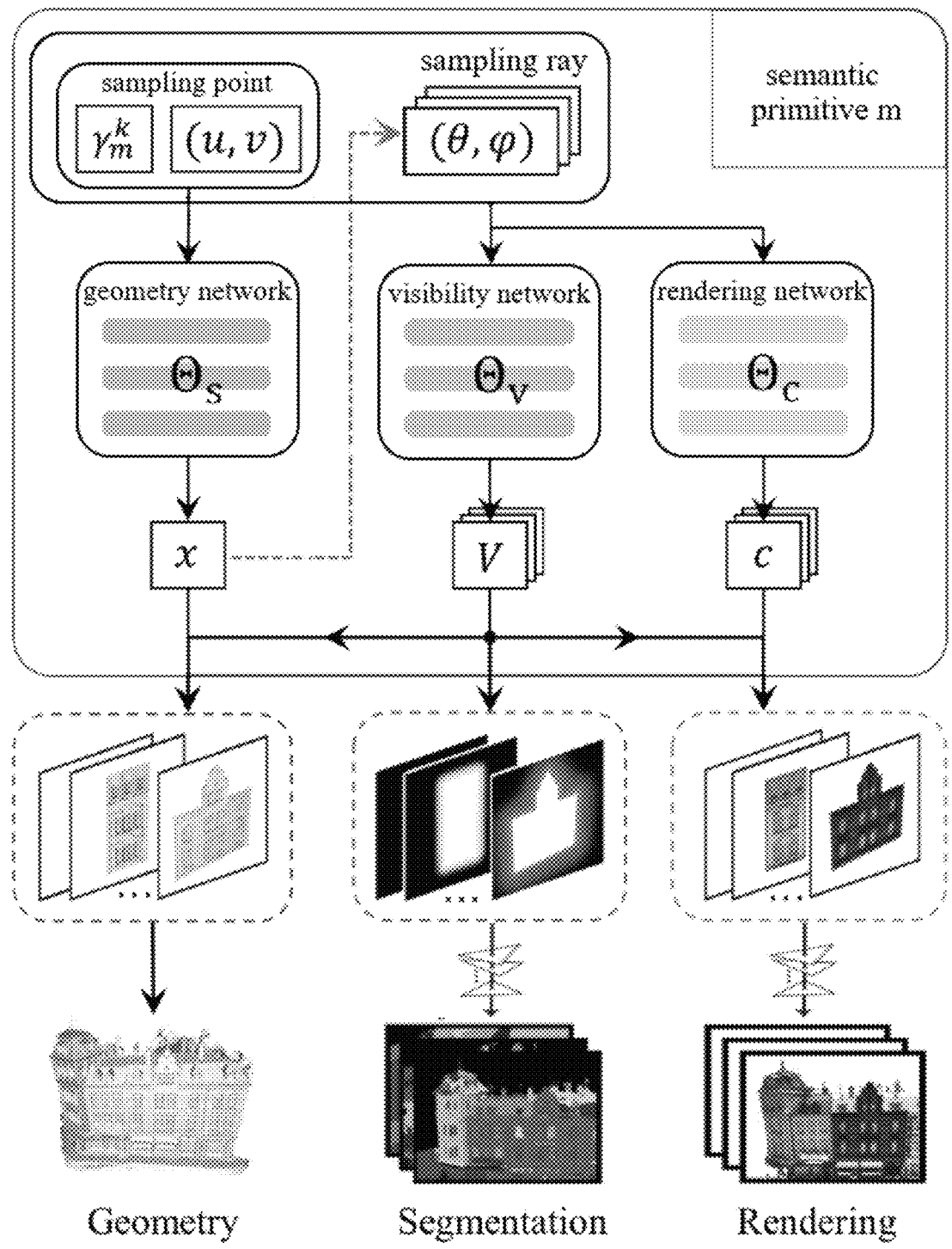
FIG. 3 is a flowchart illustrating reconstruction based on a multilayer perceptron network according to embodiments of the present disclosure.
Figure 4:
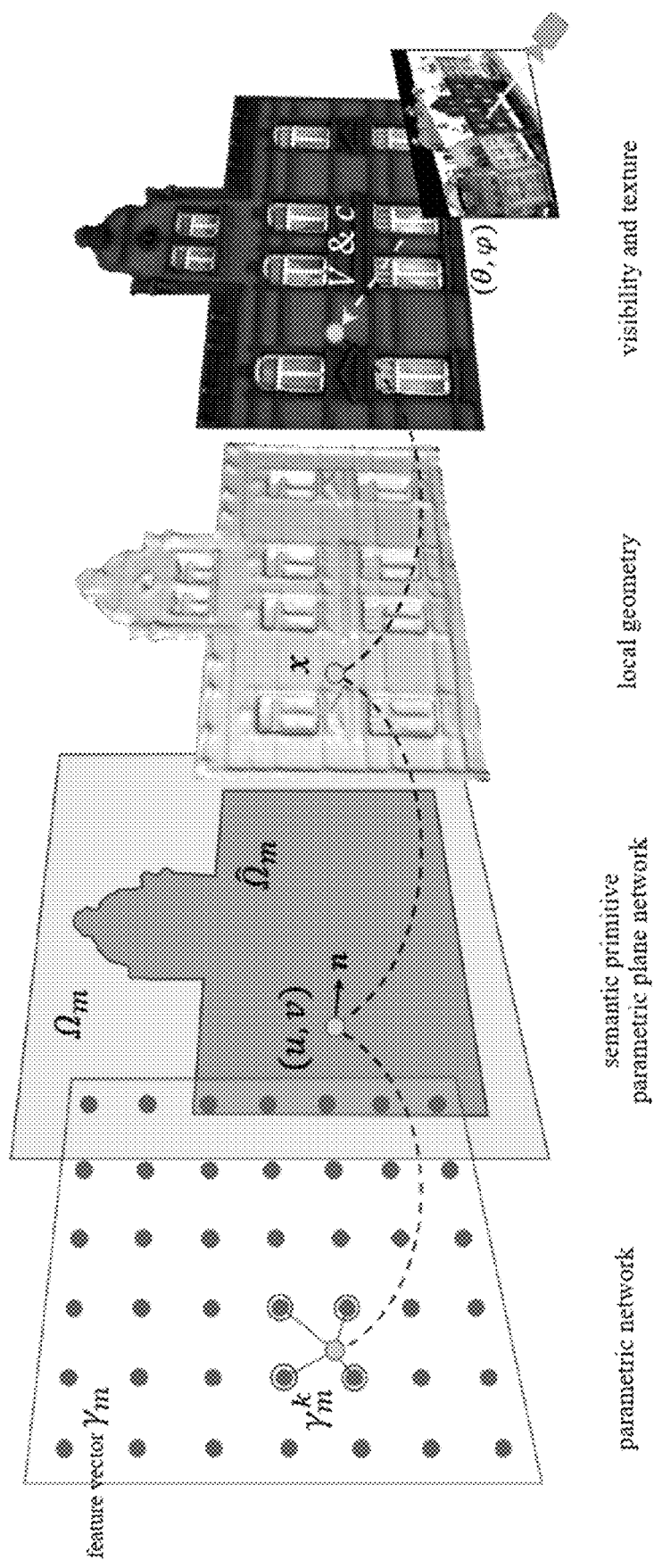
FIG. 4 is a diagram illustrating a parametric representation of a semantic primitive set according to embodiments of the present disclosure.

In combination with FIGS. 2 to 4, the following steps are described.

At S2, a coordinate offset is acquired by inputting coordinate information and a feature vector corresponding to a first grid sampling point of the semantic primitive set into a first network model, and a second grid of the semantic primitive set is acquired based on the coordinate offset and geometric attribute information of the semantic primitive set.

Specifically, this step includes local geometric modeling and optimization. In order to achieve local geometric modeling, a local two-dimensional parameter grid is established for each semantic primitive in the semantic primitive set, and each grid point in the grid corresponds to an optimizable feature vector. A multi-layer perceptron (MLP) network is used to take coordinates (u, v) of a sampling point on the two-dimensional parameter grid and a feature vector $\gamma_m^k$ obtained by neighbor interpolation as inputs of a network, to output an offset of the coordinates in the normal direction of the semantic primitive, to obtain a semantic primitive surface being added with local geometric details.

Further, in order to optimize a local geometry of each semantic primitive in the semantic primitive set, an offset of each point on each geometric semantic primitive surface is supervised by using a consistency loss function of the multi-view images, and local geometric details are optimized.

At S3, first feature information of a second grid sampling point is acquired by inputting coordinate information and a feature vector corresponding to the second grid sampling point and an observation angle value into a second network model, and outputting based on a preset visibility and color attribute information, and second feature information of the semantic primitive set is acquired based on the first feature information. The first feature information includes a visibility value and a color value of the second grid sampling point.

As an example, global geometry modeling and optimization are performed. In order to achieve global geometric modeling, a visibility attribute is defined for each point (u, v) on the geometric primitives, and the visibility attribute is modeled by a second multi-layer perceptron network. More specifically, the inputs of the network are coordinates (u, v) of the point, an interpolated feature vector $\gamma_m^k$ and an observation angle, and the output of the network is a visibility of the point (i.e., whether the point exists or is occluded).

Further, the multi-view segmented image set is used as supervision signal of a loss function, and a boundary $\hat{\Omega}_m$ of each semantic primitive in the semantic primitive set is optimized by this loss function to obtain optimized global geometric information.

As one example, appearance texture modeling and optimization are performed. A color attribute is defined for each point on the geometric primitive, and modeled by a third multi-layer perceptron network. The inputs are coordinates (u, v) of the point, an interpolated feature vector $\gamma_m^k$ and an observation angle, and an output is a color RGB value of the point.

Further, the second feature information of the semantic primitive set is acquired based on the first feature information. It may be understood that for a selected image, a back projection is performed on each pixel on the image, a ray is emitted from an optical center of a camera, and grid sampling points on all semantic primitives through which the ray passes are calculated, a calculated visibility is taken as a weight value, and a weighted summation is performed on a color value of each sampling point to obtain a final rendered color value.

Further, a color value of each semantic primitive in the semantic primitive set is optimized by using a multi-view image set as a supervision signal of a loss function, thereby modeling and optimizing the appearance texture related to the visual angle.

At S4, a light field reconstruction result of the multi-view image set is acquired based on an observation angle value of the semantic primitive set and third feature information extracted from the second feature information. The third feature information includes a spatial offset, a visibility value and a color value of the semantic primitive set.

Specifically, a network may output spatial offset, visibility and color RGB information of each semantic primitive in the semantic primitive set, by inputting the evenly sampled points and the feature vectors on each semantic primitive in the semantic primitive set and selecting a certain visual angle as an angle value. A reconstruction result may be obtained by combining each jointly optimized semantic primitive. The reconstruction result may include complete point cloud information and a rendering result.

Preferably, different types of neural network structures and parameters are used, including but not limited to the network parameter that using different network layers.

Preferably, a feature grid is replaced by a larger neural network, the disclosure is not limited thereto.

Preferably, other semantic primitive types are added or replaced, the semantic primitive type includes but is not limited to a more complex secondary, n-order curved surface, a NURBS curved surface, and a primitive relationship tree with a graphic structure.

In the disclosure, a high scene compression rate may be achieved, and effective scene information may be provided for applications such as AR/VR and digital twinning, to achieve efficient reconstruction and rendering.

Figure 5A:
FIGS. 5A and 5B are diagrams illustrating a semantic-driven intelligent reconstruction result model of a large-scene sparse light field according to embodiments of the present disclosure.
Figure 5B:
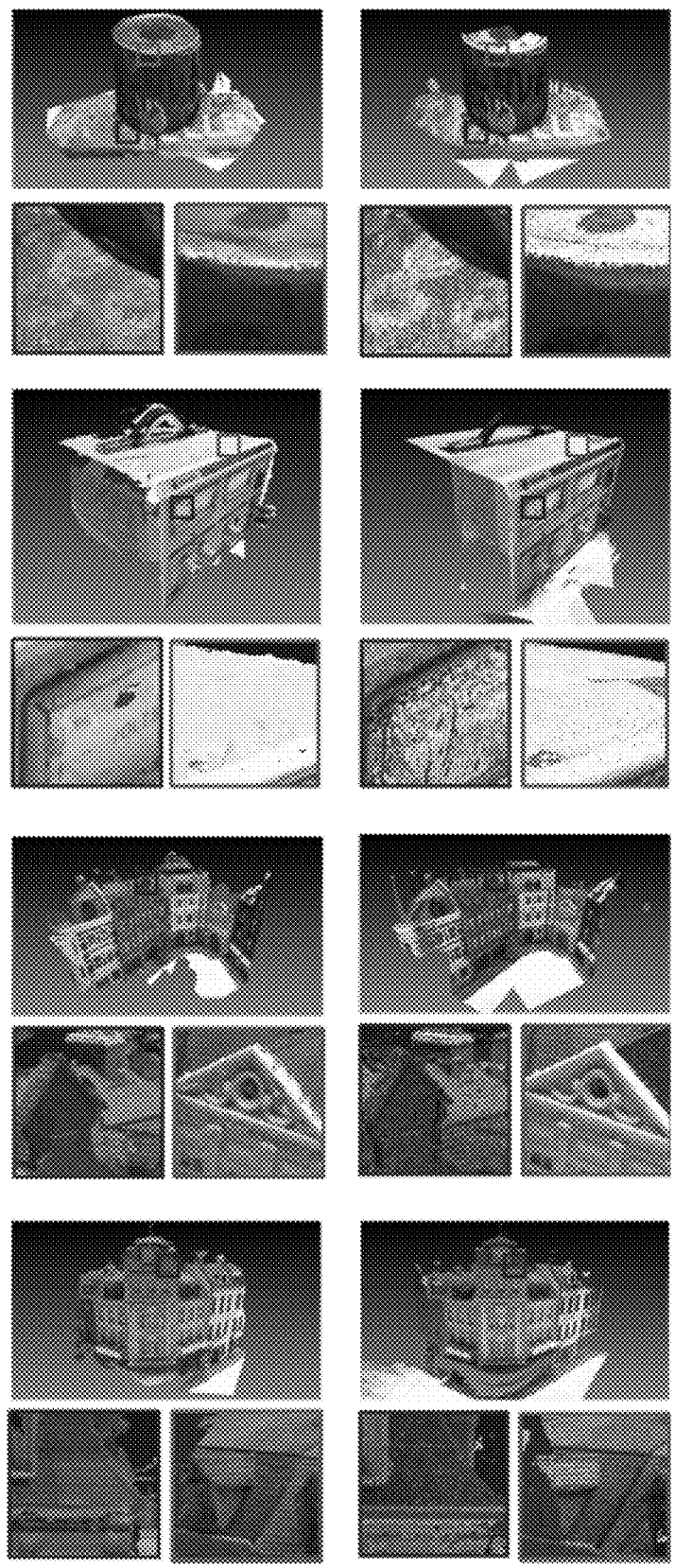

Further, in the disclosure, a DTU data set is used to train and test a sparse light field semantic reconstruction network. 22 pieces of large-scene data are selected for testing, and the testing is performed at input views with three different sparse degrees, which are respectively 5, 10, and 20 images. The test result shows that, in the present disclosure, completeness and an overall index of light field reconstruction may be effectively improved, and completeness is obviously improved relative to the current methods. The reconstruction result is as illustrated in FIGS. 5A and 5B. Three columns (a), (b) and (c) illustrated in FIG. 5A are respectively reconstruction effects of three current optimal algorithms, a column (d) in FIG. 5B is an algorithm effect of the present disclosure, and a column (e) in FIG. 5B is a reference model of a dataset (Ground Truth).

In summary, in the disclosure, due to modeling and optimization of a geometric boundary, a reconstruction completeness is greatly improved; a complex geometric surface may be modeled while the completeness is ensured, and a comprehensive metric of completeness and precision reaches the best; no additional training data are required for unsupervised optimization, and an over-fitting phenomenon for the data set does not exist. The light field reconstruction completeness is significantly improved; global and local representations and an optimization process enable a high reconstruction precision to be maintained while the completeness is improved; the lightweight representation occupies a small space, and is unsupervised and optimized rapidly, which is of positive significance for scene compression and efficient rendering.

The method for semantic-driven intelligent reconstruction of a large-scene sparse light field according to embodiments of the disclosure achieves a high-completeness and high-precision reconstruction of a large-scene light field by using semantic information in the scene with a sparse view observation. Specifically, given a sparse set of views as input, the large scene is decomposed into a plurality of semantic primitives, to overcome ambiguity of textureless regions and improve completeness of light field reconstruction; at the same time, the global geometric boundary and local geometric details of each geometric semantic primitive are optimized by a multi-view constraint and a visibility estimation to ensure precision of light field reconstruction.

An apparatus for semantic-driven intelligent reconstruction of a large-scene sparse light field provided in embodiments of the disclosure is described referring to attached drawings.

Figure 6:
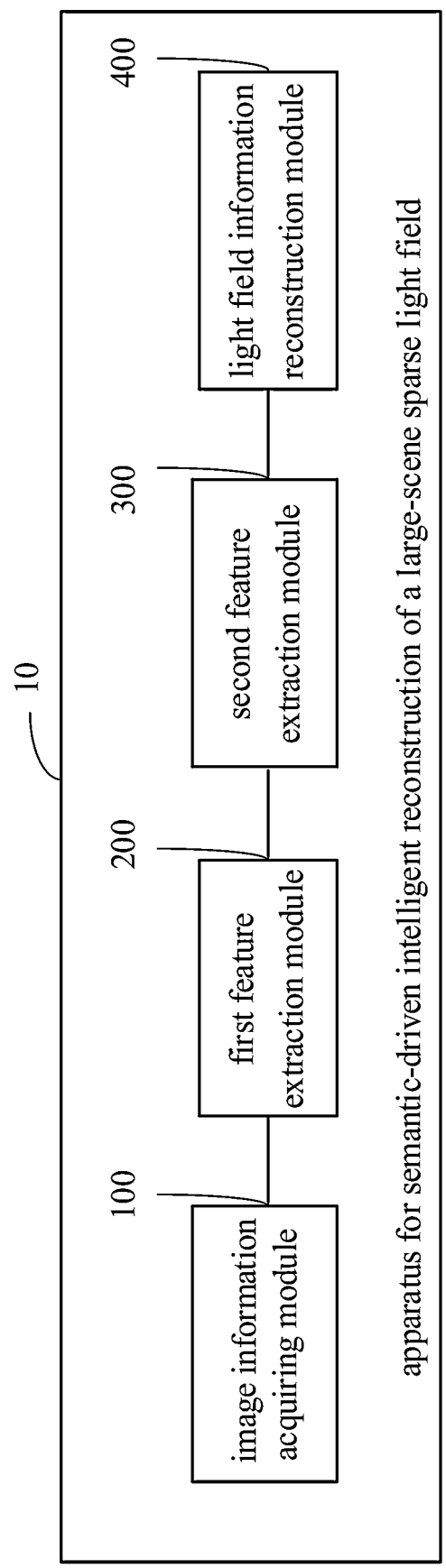
FIG. 6 is a diagram illustrating a structure of an apparatus for semantic-driven intelligent reconstruction of a large-scene sparse light field according to embodiments of the present disclosure.

FIG. 6 is a diagram illustrating a structure of an apparatus for semantic-driven intelligent reconstruction of a large-scene sparse light field according to embodiments of one the present disclosure.

As illustrated in FIG. 6, the apparatus 10 for semantic-driven intelligent reconstruction of a large-scene sparse light field includes an image information acquiring module 100, a first feature extraction module 200, a second feature extraction module 300 and a light field information reconstruction module 400.

The image information acquiring module 100 is configured to acquire a semantic primitive set of a multi-view image set. The semantic primitive set includes at least one semantic primitive, and the multi-view image set includes at least one image.

The first feature extraction module 200 is configured to acquire a coordinate offset by inputting coordinate information and a feature vector corresponding to a first grid sampling point of the semantic primitive set into a first network model, and acquire a second grid of the semantic primitive set based on the coordinate offset and geometric attribute information of the semantic primitive set.

The second feature extraction module 300 is configured to acquire first feature information of a second grid sampling point, by inputting coordinate information and a feature vector corresponding to the second grid sampling point, and an observation angle value into a second network model, and acquire second feature information of the semantic primitive set based on the first feature information. The first feature information includes a visibility value and a color value of the second grid sampling point.

The light field information reconstruction module 400 is configured to acquire alight field reconstruction result of the multi-view image set based on an observation angle value of the semantic primitive set and third feature information extracted from the second feature information. The third feature information includes a spatial offset, a visibility value and a color value of the semantic primitive set.

Further, in an embodiment of the disclosure, the image information acquiring module 100 is further configured to: acquire the multi-view image set; acquire sparse point cloud information of the multi-view image set by using a multi-view three-dimensional reconstruction algorithm; and acquire a semantic primitive set included in a point cloud by detecting the sparse point cloud information by using a geometric primitive detection algorithm.

Further, in an embodiment of the disclosure, the first feature extraction module 200 is further configured to: establish a first grid of the semantic primitive set; acquire the coordinate information of the first grid sampling point and the feature vector corresponding to the first grid sampling point; and acquire the offset of the first grid sampling point in a normal direction of the semantic primitive set output by a multi-layer perceptron network model, by inputting the coordinate information of the first grid sampling point and the feature vector corresponding to the first grid sampling point into the multi-layer perceptron network model.

Further, in an embodiment of the disclosure, the second feature extraction module 300 is further configured to: emit a ray from a camera optical center for each pixel on the multi-view image set, and calculate all second grid sampling points on all semantic primitives in the semantic primitive set through which the ray passes; and acquire the color value of the semantic primitive set by performing a weighted summation on color values of all of the second grid sampling points through which the ray passes by using the visibility values of the second grid sampling points.

Further, in an embodiment of the disclosure, the light field information reconstruction module 400 is further configured to: acquire sampling point information and the observation angle value of the semantic primitive set; input the sampling point information and the observation angle value of the semantic primitive set into the first network model and the second network model, and output and acquire the third feature information of the semantic primitive set based on the second feature information; and optimize the semantic primitive set based on the third feature information of the semantic primitive set, and obtain the light field reconstruction result based on the optimization result of the semantic primitive set, in which the light field reconstruction result includes complete point cloud information and rendering result.

It needs to be noted that, the foregoing explanation of the method embodiment is also applicable to the apparatus embodiment, which will not be repeated here.

The apparatus for semantic-driven intelligent reconstruction of a large-scene sparse light field according to embodiments of the disclosure achieves a high-completeness and high-precision reconstruction of a large-scene light field by using semantic information in the scene with a sparse view observation. Specifically, given a sparse set of views as input, the large scene is decomposed into a plurality of semantic primitives, to overcome ambiguity of textureless regions and improve completeness of light field reconstruction; at the same time, the global geometric boundary and local geometric details of each semantic primitive in the semantic primitive set are optimized by a multi-view constraint and a visibility estimation to ensure precision of light field reconstruction.

Figure 7:
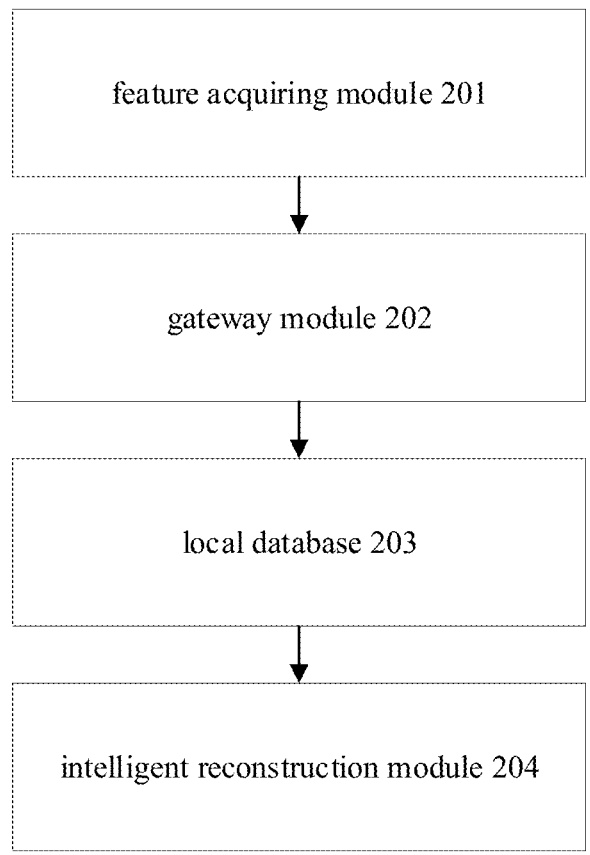
FIG. 7 is a diagram illustrating a structure of a system for semantic-driven intelligent reconstruction of a large-scene sparse light field according to embodiments of the present disclosure.

In order to achieve the above embodiments, as illustrated in FIG. 7, a system for semantic-driven intelligent reconstruction of a large-scene sparse light field is provided in embodiments. The system includes:
 a feature acquiring module 201, a gateway module 202, a local database 203 and an intelligent reconstruction module 204 successively connected;
 the intelligent reconstruction module 204 is configured to: acquire a semantic primitive set of a multi-view image set from the local database 203;

acquire a coordinate offset by inputting coordinate information and a feature vector corresponding to a first grid sampling point of the semantic primitive set into a first network model, and acquire a second grid of the semantic primitive set based on the coordinate offset and geometric attribute information of the semantic primitive set;

acquire first feature information of a second grid sampling point by inputting coordinate information and a feature vector corresponding to the second grid sampling point, and an observation angle value into a second network model, and acquire second feature information of the semantic primitive set based on the first feature information, in which the first feature information includes a visibility value and a color value of the second grid sampling point; and acquire a light field reconstruction result of the multi-view image set based on an observation angle value of the semantic primitive set and third feature information extracted from the second feature information, in which the third feature information includes a spatial offset, a visibility value and a color value of the semantic primitive set.

The system for semantic-driven intelligent reconstruction of a large-scene sparse light field according to embodiments of the disclosure achieves a high-completeness and high-precision reconstruction of a large-scene light field by using semantic information in the scene with a sparse view observation. Specifically, given a sparse set of views as input, the large scene is decomposed into a plurality of semantic primitives, to overcome ambiguity of a textureless region and improve completeness of light field reconstruction; at the same time, the global geometric boundary and local geometric details of each semantic primitive in the semantic primitive set are optimized by a multi-view constraint and a visibility estimation to ensure precision of light field reconstruction.

In addition, the terms "first" and "second" used in the present disclosure are only for description purpose, and may not be understood as relative importance of indication or implication or number of technical features indicated by implication. Therefore, features limiting "first" and "second" may explicitly or implicitly include at least one of the features. In the description of the disclosure, "a plurality of" means at least two, for example two, three, etc., unless otherwise specified.

In descriptions of the specification, descriptions with reference to terms "one embodiment", "some embodiments", "examples", "specific examples" or "some examples" etc. mean specific features, structures, materials or characteristics described in conjunction with the embodiment or example are included in at least one embodiment or example of the present disclosure. In this specification, the schematic representations of the above terms do not have to be the same embodiment or example. Moreover, specific features, structures, materials or characteristics described may be combined in any one or more embodiments or examples in a suitable manner. In addition, those skilled in the art may combine different embodiments or examples and characteristics of different embodiments or examples described in this specification without contradicting each other.

It should be understood that, notwithstanding the embodiments of the present disclosure are shown and described above, the above embodiments are exemplary in nature and shall not be construed as a limitation of the present disclosure. Those skilled in the art may change, modify, substitute and vary the above embodiments within the scope of the disclosure.

What is claimed is:

1. A method for semantic-driven intelligent reconstruction of a large-scene sparse light field, comprising:

acquiring a semantic primitive set of a multi-view image set, wherein the semantic primitive set comprises at least one semantic primitive, and the multi-view image set comprises at least one image;

acquiring a coordinate offset by inputting coordinate information and a feature vector corresponding to a first grid sampling point of the semantic primitive set into a first network model, and acquiring a second grid of the semantic primitive set based on the coordinate offset and geometric attribute information of the semantic primitive set;

acquiring first feature information of a second grid sampling point by inputting coordinate information and a feature vector corresponding to the second grid sampling point, and an observation angle value into a second network model, and acquiring second feature information of the semantic primitive set based on the first feature information, wherein the first feature information comprises a visibility value and a color value of the second grid sampling point; and acquiring a light field reconstruction result of the multi-view image set based on an observation angle value of the semantic primitive set and third feature information extracted from the second feature information, wherein the third feature information comprises a spatial offset, a visibility value and a color value of the semantic primitive set.

2. The method according to claim 1, wherein acquiring the semantic primitive set of the multi-view image set comprises:

acquiring the multi-view image set;

acquiring sparse point cloud information of the multi-view image set by using a multi-view three-dimensional reconstruction algorithm; and acquiring the semantic primitive set comprised in a point cloud scene by detecting the sparse point cloud information by using a geometric primitive detection algorithm.

3. The method according to claim 2, wherein acquiring the coordinate offset by inputting the coordinate information and the feature vector corresponding to the first grid sampling point of the semantic primitive set into the first network model comprises:

establishing a first grid of the semantic primitive set;

acquiring the coordinate information of the first grid sampling point and the feature vector corresponding to the first grid sampling point; and acquiring the offset of the first grid sampling point in a normal direction of the semantic primitive set output by a multi-layer perceptron network model, by inputting the coordinate information of the first grid sampling point and the feature vector corresponding to the first grid sampling point into the multi-layer perceptron network model.

4. The method according to claim 3, wherein acquiring the second feature information of the semantic primitive set based on the first feature information further comprises:

emitting a ray from a camera optical center for each pixel on the multi-view image set, and calculating second grid sampling points on all semantic primitives through which the ray passes; and acquiring the color value of the semantic primitive set by performing a weighted summation on color values of all of the second grid sampling points through which the ray passes by using the visibility values of the second grid sampling points.

5. The method according to claim 4, wherein acquiring the light field reconstruction result of the multi-view image set based on the observation angle value of the semantic primitive set and the third feature information extracted from the second feature information comprises:
acquiring sampling point information and the observation angle value of the semantic primitive set;
inputting the sampling point information and the observation angle value of the semantic primitive set into the first network model and the second network model, and outputting and acquiring the third feature information of the semantic primitive set based on the second feature information; and
optimizing the semantic primitive set based on the third feature information of the semantic primitive set, and obtaining the light field reconstruction result based on an optimization result of the semantic primitive set; wherein the light field reconstruction result comprises complete point cloud information and a rendering result.

6. The method according to claim 2, wherein after acquiring the semantic primitive set of the multi-view image set, the method further comprises:
acquiring a multi-view segmented image set by segmenting the multi-view image set based on the semantic primitive set and the sparse point cloud information;
acquiring a second optimized semantic primitive set by optimizing the visibility value of the semantic primitive set by using the multi-view segmented image set as a supervision signal of a first loss function; and
acquiring a third optimized semantic primitive set by optimizing the color value of the semantic primitive set by using the multi-view image set as a supervision signal of a second loss function.

7. The method according to claim 1, wherein after acquiring the coordinate offset, the method further comprises:
performing loss calculation on a coordinate offset of the second grid sampling point of the semantic primitive set by using a multi-view image consistency loss function; and
obtaining a first optimized semantic primitive set based on a loss calculation result.

8. An apparatus for semantic-driven intelligent reconstruction of a large-scene sparse light field, comprising:
a processor; and
a memory storing a computer program which, when executed by the processor, the processor is configured to:
acquire a semantic primitive set of a multi-view image set from a local database, wherein the semantic primitive set comprises at least one semantic primitive, and the multi-view image set comprises at least one image;
acquire a coordinate offset by inputting coordinate information and a feature vector corresponding to a first grid sampling point of the semantic primitive set into a first network model, and acquire a second grid of the semantic primitive set based on the coordinate offset and geometric attribute information of the semantic primitive set;
acquire first feature information of a second grid sampling point by inputting coordinate information and a feature vector corresponding to the second grid sampling point, and an observation angle value into a second network model, and acquire second feature information of the semantic primitive set based on the first feature information, wherein the first feature information comprises a visibility value and a color value of the second grid sampling point; and
acquire a light field reconstruction result of the multi-view image set based on an observation angle value of the semantic primitive set and third feature information extracted from the second feature information, wherein the third feature information comprises a spatial offset, a visibility value and a color value of the semantic primitive set.

9. The apparatus according to claim 8, wherein the processor is further configured to:
acquire the multi-view image set;
acquire sparse point cloud information of the multi-view image set by using a multi-view three-dimensional reconstruction algorithm; and
acquire the semantic primitive set comprised in a point cloud scene by detecting the sparse point cloud information by using a geometric primitive detection algorithm.

10. The apparatus according to claim 9, wherein the processor is further configured to:
establish a first grid of the semantic primitive set;
acquire the coordinate information of the first grid sampling point and the feature vector corresponding to the first grid sampling point; and
acquire the offset of the first grid sampling point in a normal direction of the semantic primitive set output by a multi-layer perceptron network model, by inputting the coordinate information of the first grid sampling point and the feature vector corresponding to the first grid sampling point into the multi-layer perceptron network model.

11. The apparatus according to claim 10, wherein the processor is further configured to:
emit a ray from a camera optical center for each pixel on the multi-view image set, and calculate second grid sampling points on all semantic primitives through which the ray passes; and
acquire the color value of the semantic primitive set by performing a weighted summation on color values of all of the second grid sampling points through which the ray passes by using the visibility values of the second grid sampling points.

12. The apparatus according to claim 11, wherein the processor is further configured to:
acquire sampling point information and the observation angle value of the semantic primitive set;
input the sampling point information and the observation angle value of the semantic primitive set into the first network model and the second network model, and output and acquire the third feature information of the semantic primitive set based on the second feature information; and
optimize the semantic primitive set based on the third feature information of the semantic primitive set, and obtain the light field reconstruction result based on an optimization result of the semantic primitive set; wherein the light field reconstruction result comprises complete point cloud information and a rendering result.

13. The apparatus according to claim 9, wherein after acquiring the semantic primitive set of the multi-view image set, the processor is further configured to:
acquire a multi-view segmented image set by segmenting the multi-view image set based on the semantic primitive set and the sparse point cloud information;
acquire a second optimized semantic primitive set by optimizing the visibility value of the semantic primitive set by using the multi-view segmented image set as a supervision signal of a first loss function; and
acquire a third optimized semantic primitive set by optimizing the color value of the semantic primitive set by using the multi-view image set as a supervision signal of a second loss function.

14. The apparatus according to claim 8, wherein after acquiring the coordinate offset, the processor is further configured to:
perform loss calculation on a coordinate offset of the second grid sampling point of the semantic primitive set by using a multi-view image consistency loss function; and
obtain a first optimized semantic primitive set based on a loss calculation result.

15. A non-transitory computer-readable storage medium storing a computer program which, when executed by a processor of an apparatus, causes the apparatus to perform a method for semantic-driven intelligent reconstruction of a large-scene sparse light field, the method comprising:
acquiring a semantic primitive set of a multi-view image set, wherein the semantic primitive set comprises at least one semantic primitive, and the multi-view image set comprises at least one image;
acquiring a coordinate offset by inputting coordinate information and a feature vector corresponding to a first grid sampling point of the semantic primitive set into a first network model, and acquiring a second grid of the semantic primitive set based on the coordinate offset and geometric attribute information of the semantic primitive set;
acquiring first feature information of a second grid sampling point by inputting coordinate information and a feature vector corresponding to the second grid sampling point, and an observation angle value into a second network model, and acquiring second feature information of the semantic primitive set based on the first feature information, wherein the first feature information comprises a visibility value and a color value of the second grid sampling point; and
acquiring a light field reconstruction result of the multi-view image set based on an observation angle value of the semantic primitive set and third feature information extracted from the second feature information, wherein the third feature information comprises a spatial offset, a visibility value and a color value of the semantic primitive set.

16. The non-transitory computer-readable storage medium according to claim 15, wherein acquiring the semantic primitive set of the multi-view image set comprises:
acquiring the multi-view image set;
acquiring sparse point cloud information of the multi-view image set by using a multi-view three-dimensional reconstruction algorithm; and
acquiring the semantic primitive set comprised in a point cloud scene by detecting the sparse point cloud information by using a geometric primitive detection algorithm,
wherein after acquiring the semantic primitive set of the multi-view image set, the method further comprises:
acquiring a multi-view segmented image set by segmenting the multi-view image set based on the semantic primitive set and the sparse point cloud information;
acquiring a second optimized semantic primitive set by optimizing the visibility value of the semantic primitive set by using the multi-view segmented image set as a supervision signal of a first loss function; and
acquiring a third optimized semantic primitive set by optimizing the color value of the semantic primitive set by using the multi-view image set as a supervision signal of a second loss function.

17. The non-transitory computer-readable storage medium according to claim 16, wherein acquiring the coordinate offset by inputting the coordinate information and the feature vector corresponding to the first grid sampling point of the semantic primitive set into the first network model comprises:
establishing a first grid of the semantic primitive set;
acquiring the coordinate information of the first grid sampling point and the feature vector corresponding to the first grid sampling point; and
acquiring the offset of the first grid sampling point in a normal direction of the semantic primitive set output by a multi-layer perceptron network model, by inputting the coordinate information of the first grid sampling point and the feature vector corresponding to the first grid sampling point into the multi-layer perceptron network model.

18. The non-transitory computer-readable storage medium according to claim 17, wherein acquiring the second feature information of the semantic primitive set based on the first feature information further comprises:
emitting a ray from a camera optical center for each pixel on the multi-view image set, and calculating second grid sampling points on all semantic primitives through which the ray passes; and
acquiring the color value of the semantic primitive set by performing a weighted summation on color values of all of the second grid sampling points through which the ray passes by using the visibility values of the second grid sampling points.

19. The non-transitory computer-readable storage medium according to claim 18, wherein acquiring the light field reconstruction result of the multi-view image set based on the observation angle value of the semantic primitive set and the third feature information extracted from the second feature information comprises:
acquiring sampling point information and the observation angle value of the semantic primitive set;
inputting the sampling point information and the observation angle value of the semantic primitive set into the first network model and the second network model, and outputting and acquiring the third feature information of the semantic primitive set based on the second feature information; and
optimizing the semantic primitive set based on the third feature information of the semantic primitive set, and obtaining the light field reconstruction result based on an optimization result of the semantic primitive set;
wherein the light field reconstruction result comprises complete point cloud information and a rendering result.

20. The non-transitory computer-readable storage medium according to claim 15, wherein after acquiring the coordinate offset, the method further comprises:
  performing loss calculation on a coordinate offset of the second grid sampling point of the semantic primitive set by using a multi-view image consistency loss function; and
  obtaining a first optimized semantic primitive set based on a loss calculation result.

* * * * *